Figure 1:
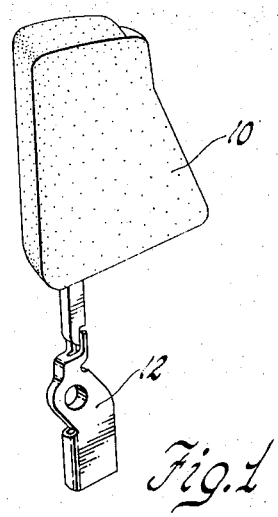

United States Patent [19]
Lange

[11] 3,764,811
[45] Oct. 9, 1973

[54] METHOD OF TESTING FOR LEAKS IN LOW DENSITY ARTICLES

[75] Inventor: Walter H. Lange, Fraser, Mich.

[73] Assignee: General Motors Corporation, Detroit, Mich.

[22] Filed: May 4, 1972

[21] Appl. No.: 250,149

[52] U.S. Cl. .............................. 250/302, 250/362
[51] Int. Cl. .............................................. G01n 23/00
[58] Field of Search .................. 250/43.5 D, 83.3 D, 250/71 T, 83 SA

[56] References Cited
UNITED STATES PATENTS
2,707,236  4/1955  De Forest ........................ 250/71 T
3,624,397  11/1971  Honeycutt et al. ........ 250/83.3 D X Primary Examiner—Archie R. Borchelt
Attorney—Jean L. Carpenter et al.

[57] ABSTRACT

Plastic foam carburetor floats are inspected for leaks by subjecting the floats to a radiopaque solution (e.g., zinc chloride), under pressure to impregnate those floats having leaks, then irradiating each float with gamma rays from an Americium 241 source and detecting the intensity of the transmitted radiation by a scintillation detector or Geiger counter. Those floats having leaks transmit a detectably smaller amount of radiation than good floats.

3 Claims, 2 Drawing Figures

METHOD OF TESTING FOR LEAKS IN LOW DENSITY ARTICLES

This invention relates to a method of testing for leaks in articles and particularly to such a method impregnating articles with a radiopaque solution and measuring the radiation transmissivity thereof.

Carburetors for automotive vehicles often use a low density foam plastic float. Slight variations in the float manufacturing processes can result in imperfect homogeniety of the material leaving excessively thin cell walls or internal voids in certain areas. These defects can be present in spite of a uniformly intact outer skin so that floats having leaks cannot be eliminated even by the most careful visual inspection. It is therefore desirable to provide a method of inspecting such articles on a high volume basis at a minimal expense. While it is known to utilize radiography, both with the addition of a radiopaque material and without, for the inspection of voids within materials, that method is both slow and expensive.

It is therefore a general object of this invention to provide a method for detecting leaks in low density articles on a large volume and inexpensive basis.

It is a further object of this invention to radiometrically detect leaks in low density articles on a large volume and inexpensive basis.

It is a further object of this invention to radiometrically detect leaks in foam plastic articles by selectively impregnating such articles with a radiopaque solution and sensing the presence of such solution.

The invention is carried out by subjecting a low density article to a radiopaque solution under pressure to impregnate the article with the solution if the article contains a leak, irradiating the article with radiation which is only slightly attenuated by the article but which is greatly attenuated by the radiopaque solution, and detecting the transmitted radiation wherein the intensity of the transmitted radiation is a measure of whether a significant leak is present.

Figure 2:
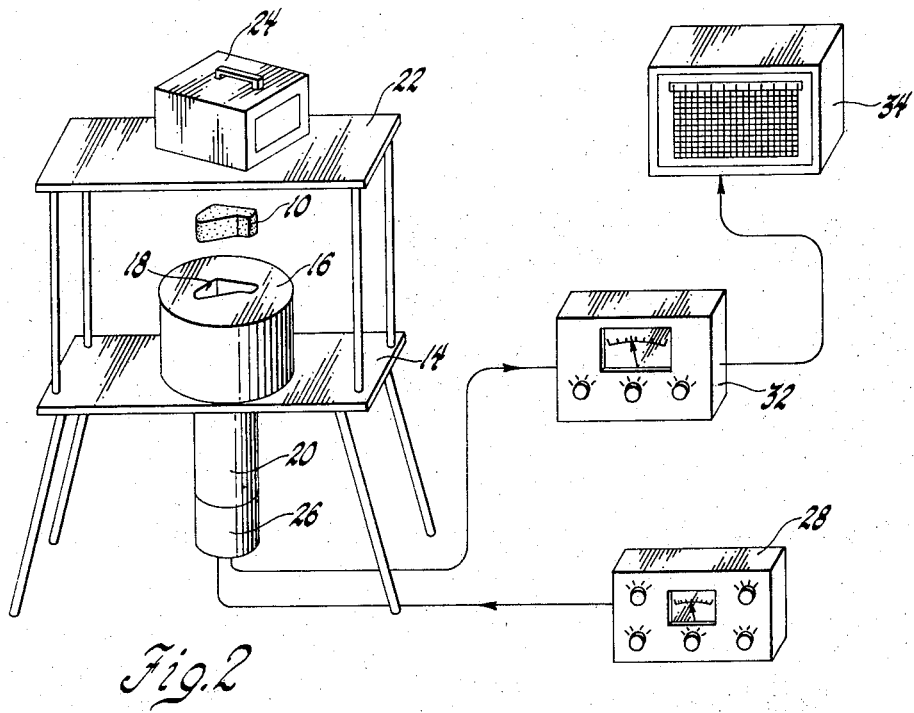

The above and other advantages will be made more apparent from the following specification taken in conjunction with the accompanying drawings wherein like reference numerals refer to like parts and wherein:

FIG. 1 is a plastic foam carburetor float to be tested by the method of this invention; and, FIG. 2 is a diagrammatic illustration of apparatus for measuring the radiation passing through the article and used in carrying out the method of this invention.

FIG. 1 depicts a carburetor float 10 made of a low density plastic foam, preferably nitrophyl, and having a metallic float linkage 12 attached thereto. The density of the float material is so low, about 0.1 gram per cc. that the presence of foreign material is readily detectable with low energy gamma radiation. To determine whether the foam plastic float has leaks which would render it unsuitable for service in a carburetor, the float is subjected to a solution of radiopaque salt so that voids in the float which are accessible to liquid, will be filled with the radiopaque salt and the float is then tested for the presence of salt by irradiation by a low energy gamma source and measuring the radiation transmitted therethrough. Transmitted radiation intensities which are below a norm established by the irradiation of non-leaking floats then indicate that a substantial leak is present and should be rejected. A preferred radiation source has been found to be a 100 millicurie Americium-241 source which emits 60 kev gamma radiation. For use with that source, a large number of suitable radiopaque salt solutions are available and include among others, zinc bromide, barium bromide, lead nitrate and zinc chloride.

Specifically the method has been carried out by immersing a batch of several floats in a closed container of a radiopaque solution by applying a vacuum of 25 of Hg for 3 minutes to partially evacuate trapped gases from voids therein and then applying pressure at 30 psi for 10 minutes to impregnate voids in the floats through any leaks. The floats are rinsed to remove radiopaque solution adhering to the surface thereof and then examined by measuring the radiation intensity transmitted through them by the apparatus illustrated in FIG. 2. There, a table 14 supports a collimator shield assembly 16 which has a window 18 in the top thereof conforming in shape to the float 10. A scintillation detector 20 is supported below the table 14 in line with the window 18. A shelf 22 above the table 14 supports an Americium-241 source, not shown, contained in a shield 24 also aligned with the window 18. A pulse preamplifier 26 is connected to the scintillation detector and is connected to a high voltage power supply 28. The output of the preamplifier is fed to a count rate meter 32 which in turn supplies a count rate signal to a recorder 34.

In operation, the float 10 is placed over the window 18 and the gamma radiation from the Americium source is transmitted through the float and is detected by the scintillation detector 20. The readout instruments 32,34 then indicate the transmitted radiation intensity. By measuring the radiation intensity of several good floats, a norm or standard intensity value is established. Then by comparing the radiation intensity of the sample under test with the standard value, it is readily determined whether the sample is a good float or one which has a leak as established by a radiation intensity below normal. To facilitate measurements, a sliding tray arrangement not shown may be used to sequentially position a plurality of floats between the source and detector. In this manner, a plurality of measurements can be made on several floats at a rate averaging about two seconds per float. If desired, a Geiger counter detector may be used in place of a scintillation detector at a slight sacrifice in sensitivity and providing the advantage of a lower expense and greater ruggedness. When using a saturated zinc chloride radiopaque solution, it has been found that the sensitivity of this method is such that an impregnation of about 0.2 grams per float for a float weighing approximately 5.5 grams is detectable.

It will be apparent that this invention is not limited in application to testing of carburetor floats but is equally suitable for testing other low density articles subject to leaks.

The embodiment of the invention described herein is for purposes of illustration and the scope of the invention is intended to be limited only by the following claims:

It is claimed:

1. A method of inspecting a low density article for leaks comprising
   subjecting the article to a liquid radiopaque material under pressure so that the article will be impregnated with radiopaque material only when a leak is present, irradiating the article with a penetrating radiation which readily passes through the article and is attenuated by the radiopaque material, measuring the intensity of radiation transmitted through the article and comparing the value of the transmitted radiation with a predetermined standard value, whereby the article is identified as having a leak when the transmitted value is below the standard value.

2. A method of inspecting a low density plastic foam article for leaks comprising subjecting the article to a liquid radiopaque material under pressure so that the article will be impregnated with radiopaque material only when a leak is present, rinsing the surface of the article to remove radiopaque material therefrom, irradiating the article with a low energy gamma radiation which readily passes through the plastic foam and is attenuated by the radiopaque material, measuring the intensity of radiation transmitted through the article and comparing the value of the transmitted radiation with a predetermined standard value, whereby the article is identified as having a leak when the transmitted value is below the standard value.

3. A method of inspecting low density plastic foam floats for leaks comprising immersing a batch of several floats in a radiopaque solution in a closed container, imposing a partial vacuum in the container, then subjecting the immersed articles to pressure above atmospheric pressure so that any float having a leak will be impregnated with radiopaque solution, rinsing the surface of each float to remove radiopaque material therefrom, irradiating each float with a low energy gamma radiation which readily passes through the plastic foam and is attenuated by the radiopaque material, measuring the intensity of radiation transmitted through each float and comparing the value of the transmitted radiation with a predetermined standard value, whereby each float is identified as having a leak when the transmitted radiation value is below the standard value.

* * * * *